United States Patent [19]

Wessel et al.

[11] 4,407,115

[45] Oct. 4, 1983

[54] HAYMAKING MACHINE

[75] Inventors: Ulrich Wessel; Albrecht Scherer, both of Gottmadingen, Fed. Rep. of Germany

[73] Assignee: Klöckner-Humboldt-Deutz AG (Branch Establishment Fahr), Gottmadingen, Fed. Rep. of Germany

[21] Appl. No.: 284,574

[22] Filed: Jul. 17, 1981

[30] Foreign Application Priority Data

Jul. 25, 1980 [DE] Fed. Rep. of Germany ....... 3028350

[51] Int. Cl.³ ...................... A01D 78/00; A01D 80/02
[52] U.S. Cl. ......................................... 56/370; 56/377
[58] Field of Search .......................... 56/365, 370, 377

[56] References Cited

U.S. PATENT DOCUMENTS 3,995,416 12/1976 van der Lely ........................ 56/370
4,329,837 5/1982 Vissers et al. ..................... 56/377 X

FOREIGN PATENT DOCUMENTS 2607072 9/1976 Fed. Rep. of Germany ........ 56/370
2646829 6/1977 Fed. Rep. of Germany ........ 56/370

*Primary Examiner*—Robert P. Swiatek
*Attorney, Agent, or Firm*—Karl F. Ross; Herbert Dubno

[57] ABSTRACT

A haymaking machine of the type having a pair of raking wheels rotatable about generally upright axes in the same sense or in opposite senses depending upon the type of haymaking operation involved. In order to provide a resilient characteristic to the prongs which is the same in both senses of rotation, each prong is mounted swingably on a pivot member whose bolt is connected to one end of a stack of spring-steel strips forming a torsion spring. The latter extends through a tube fixed to the frame of the wheel and is anchored to this tube by another sleeve whose angular position relative to the tube can be adjusted.

4 Claims, 3 Drawing Figures

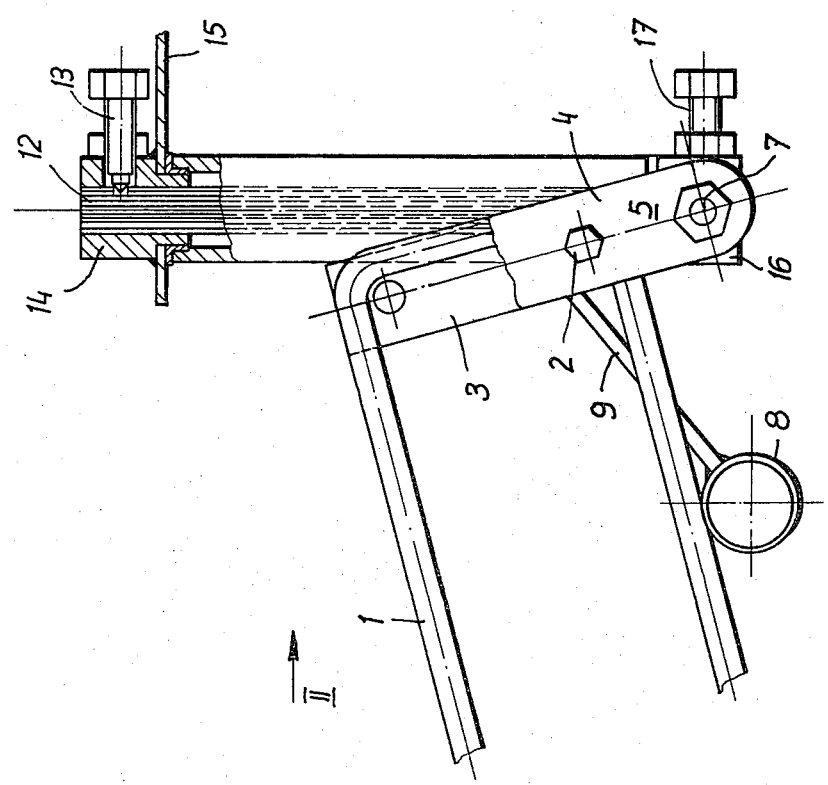

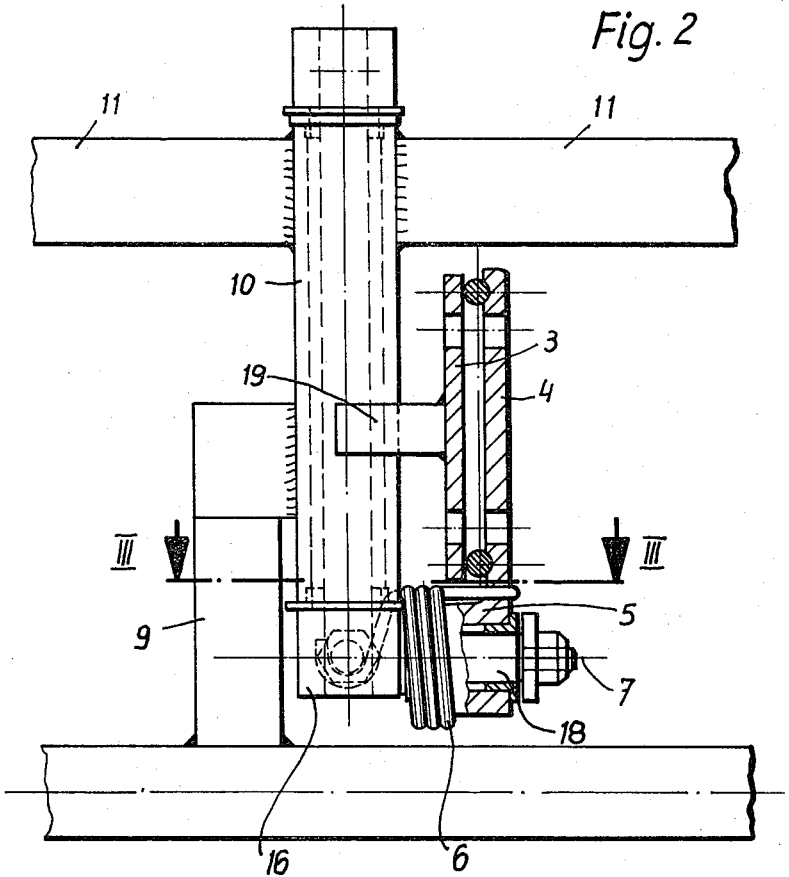
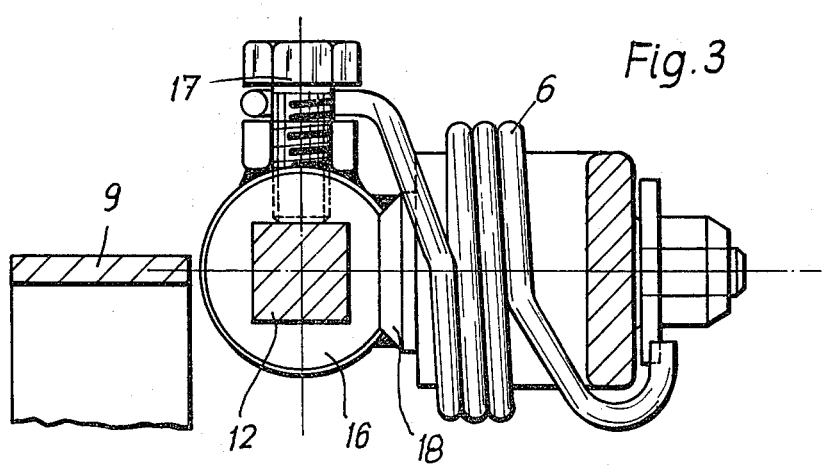

HAYMAKING MACHINE

FIELD OF THE INVENTION

The invention relates to a haymaking machine with two raking wheels which are mounted rotatably, within the frame of the machine, about approximately vertical axes and can be driven either in the same direction or in opposite directions and to which a plurality of prongs is fastened resiliently.

BACKGROUND OF THE INVENTION

A haymaking machine of this type permits two different types of operation, namely tedding and swathing. Such haymaking machines are therefore also called "universal" haymaking machines.

During tedding, the two raking wheels are located at the same height transversely to the direction of travel. Thus, the prongs assume a radial position relative to the axes of rotation of the raking wheels, and the tips of the prongs of the two raking wheels overlap. In this type of operation of the haymaking machine, the raking wheels are driven in opposite senses, so that the harvested crop is drawn in towards the center and is spread out broadly to the rear.

During swathing, the raking wheels are adjusted obliquely to the direction of travel and are driven in the same sense. The prongs are pivoted into a more tangential position relative to the raking wheels. As a result, in particular, the overlapping of the prongs is eliminated. The raking wheel lying at the front in a direction of travel transfers the raked-together harvest crop to the raking wheel lying further behind and offset. This raking wheel then rakes to the side all the harvest crop which is obtained, so that a side swath is formed by means of a swath shaper, for example a rubber flap or the like.

Whereas, during tedding, the raking wheels must be driven in opposite directions, it is absolutely essential, during swathing, that the two raking wheels be driven in the same direction. Because of the different directions of rotation of the raking wheels, considerable problems arise when conventional spring prongs terminating in coiled ends are used. For reasons of strength, the prongs should be stressed only in such as way that these coils tighten. To solve this problem, it has already been proposed (see Austrian Patent Application No. 3833/76) to arrange the prong-supporting part so that it can pivot through 180° and can be locked in its end positions, to ensure that the spring coils located at the end of the prong tighten in any direction of rotation of the raking wheel. As has been shown in practice, however, the adjustment work necessary for this purpose, especially when it has to be carried out individually, is felt to be irksome by the operator.

OBJECT OF THE INVENTION

The object of the invention is to improve a haymaking machine of this type, with regard to the resilient fastening of the prongs, so that the same spring characteristic is obtained for both directions of rotation of the raking wheel.

SUMMARY OF THE INVENTION

This object is achieved, according to the invention, in that the prongs are each fastened at one end of a torsion spring, the other end of which is fastened to the raking wheel, and that the free end of the prongs is located at a distance from the longitudinal axis of the torsion spring assigned thereto.

When a force acting in the peripheral direction of the raking wheel is exerted on the free end of the prongs, the prong yields, with a simultaneous twisting of the torsion spring. The operation is independent of the direction of rotation of the raking wheel, because the torsion spring has, in both directions of rotation, the same characteristic curve and the same length of life.

The torsion spring preferably consists of a stack of steel strips, so that it still remains fully operative even if one steel strip breaks.

The torsion spring is appropriately located in a tube piece fastened to the associated raking wheel, so that it is protected against external effects. This design also has the advantage that the torsion spring needs to absorb only the forces exerted on the prong in the peripheral direction of the raking wheel. So that the basic position of the prong relative to the tube piece can be adjusted, the end of the torsion spring remote from the prong can be fastened to a flat iron, of which the relative position with respect to the tube piece can be adjusted and locked.

In order to put into effect the centrifugal control, known per se, of the prongs in the resilient fastening, according to the invention, of the prongs, in a further embodiment of the invention, the tube piece is arranged approximately vertically, a bolt is fastened at the lower end of the torsion spring and has an axis extending approximately tangentially to the raking wheel and on which the prong is mounted rotatably, and the bolt carries a volute spring which is supported on the tube piece and on the prong, so as to lift the latter out against the centrifugal force.

BRIEF DESCRIPTION OF THE DRAWING

Further details, advantages and features of the invention will be found in the following description reference being made to the accompanying drawing in which:

FIG. 1 is an elevational view of the resilient fastening of a prong in a vertical plane containing the axis of rotation of the raking wheel partly broken away;

FIG. 2 is a partial section which shows the arrangement according to FIG. 1, looking from the left; and FIG. 3 is a horizontal cross-section along the plane III—III in FIG. 2.

SPECIFIC DESCRIPTION

The fork-shaped prong 1 shown in FIG. 1 consists of spring-steel wire and extends outwards from the axis of rotation (located to the right and shown by a dot-dash line), of the raking wheel. The prong 1 is clamped by means of clamping screws 2 between two bearing plates 3 and 4. The bearing plate 4 is an integral part of a pivoting angle-piece 5 which can pivot on a bolt 18 about a horizontal axis 7 against the effect of a volute spring 6 (see FIGS. 2 and 3). The prong is, therefore, a prong which is swung into operation by centrifugal force and which, when the raking wheel stops, is lifted out as a result of the force of the volute spring 6.

Shackles 9 (FIG. 2), to the lateral upper ends of which are welded tube pieces 10, are welded to a supporting tube 8 which surrounds the axis of rotation of the raking wheel concentrically and which forms an integral part of the latter. The tube pieces 10 parallel to the axis of rotation of the raking wheel are connected to one another, for stiffening, by horizontal struts 11. A torsion spring 12 passes through each of the tube pieces 10. As is indicated in FIG. 1, the torsion spring 12 consists of a stack of spring-steel strips. The upper end of the torsion spring 12 is fixed by means of a locking screw 13 in an upper sleeve 14 which is mounted rotatably in the supporting tube 10. The upper sleeve 14 is fastened to a flat iron 15, for example by welding. The flat iron 15 can be locked in different angular positions relative to the tube piece 10, so that the position of rest of the torsion spring 12 can be adjusted.

A further sleeve 16 is fastened to the lower end of the torsion spring 12 by means of a locking screw 17. A bolt 18 forming the horizontal pivot axis 7 for the pivoting angle-piece 5 is welded to this sleeve 16 which is mounted rotatably in the tube piece 10. Fastened, for example by welding, to the bearing plate 3 is a stop 19 which rests against the tube piece 10 in the position of rest of the prong, that is to say when the raking wheel is stopped.

As soon as the raking wheel is made to rotate, the prong 1 swings, as a result of the centrifugal force, outwardly against the force of the volute spring 6 about the horizontal axis 7 of the bolt 18, until it rests against the supporting tube 8. When an excessive force is now exerted on the prong end in a peripheral direction, this force generates, in relation to the axis of rotation of the sleeve 16, a torque, under the influence of which the torsion spring is twisted. The sleeve 16, the bolt 18, the bearing plates 3, 4 and the prong 1 are consequently twisted relative to the tube piece 10, so that excessive loading of the prong 1 is avoided. It is obvious that this operation is independent of the direction of rotation of the raking wheel, because the torsion spring 12 has the same spring characteristic in both directions of rotation.

We claim:

1. In a haymaking machine having two raking wheels mounted rotatably upon a machine frame about respective approximately vertical axes so as to be driven in the same sense or in opposite senses, and an array of prongs on each of said wheels engageable with crops material and deflectible against elastic force, the improvement which comprises for each prong:
   a tube piece extending parallel to the axis of rotation of the respective wheel and secured thereto;
   a torsion spring formed by a stack of spring-steel strips extending in said tube piece;
   means for securing one end of said stack to said tube piece, the other end of said stack being free to rotate relative to said tube piece; and
   means for connecting a respective prong to said other end of said stack with the prong extending outwardly from the respective axis of the respective wheel so that each torsion spring presents the same spring characteristic to the prong in both senses of rotation of the respective wheel.

2. The improvement defined in claim 1 wherein said means for securing said one end of said stack to said tube piece includes a sleeve received in said tube piece and secured to said stack, and a flat iron secured to said sleeve, angularly adjustable with respect to said tube piece and adapted to be locked thereto.

3. The improvement defined in claim 2 wherein said means for connecting the respectve prong to the other end of said stack includes a further sleeve anchored to the other end of said stack and provided with a bolt having an axis extending approximately tangentially to the orbit to the respective rake wheel and transversely to the respective tube piece, a volute spring surrounding said bolt and having one end fixed relative to said further sleeve, and support means carrying said prong and pivotally mounted to swing about the axis of said bolt and engaged by the other end of said volute spring whereby the prong is lifted out against the action of centrifugal force on said prong.

4. The improvement defined in claim 1 wherein the means for securing said one end of said stack to said tube piece and the means for connecting the respective prong to said other end of said stack each includes a bolt having an end engaging said stack.

* * * * *